(12) United States Patent (10) Patent No.: US 12,630,011 B2

Miyazaki et al. (45) Date of Patent: May 19, 2026

(54) WORK VEHICLE

(71) Applicant: Kubota Corporation, Osaka (JP)

(72) Inventors: Daisuke Miyazaki, Sakai (JP); Makoto Imaizumi, Sakai (JP); Yasuaki Morioka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/215,438

(22) Filed: May 22, 2025

(65) Prior Publication Data

US 2025/0282216 A1 Sep. 11, 2025

Related U.S. Application Data

(63) Continuation of application No. PCT/JP2023/031281, filed on Aug. 29, 2023.

(30) Foreign Application Priority Data

Dec. 27, 2022 (JP) ................................. 2022-210897

(51) Int. Cl.
| | |
|---|---|
| *B60K 17/28* | (2006.01) |
| *B60K 1/02* | (2006.01) |
| *B60K 17/08* | (2006.01) |
| *B60L 50/60* | (2019.01) |
| *F16H 57/04* | (2010.01) |

(52) U.S. Cl.
CPC ................ *B60K 17/28* (2013.01); *B60K 1/02* (2013.01); *B60K 17/08* (2013.01); *B60L 50/60* (2019.02); *F16H 57/045* (2013.01); *F16H 57/048* (2013.01); *B60L 2200/40* (2013.01)

(58) Field of Classification Search
CPC .......... B60K 17/28; B60K 1/02; B60K 17/08; B60L 50/60; B60L 2200/40; F16H 57/045; F16H 57/048
See application file for complete search history.

(56) References Cited

FOREIGN PATENT DOCUMENTS

| | | | | |
|---|---|---|---|---|
| JP | S5715727 U | | 1/1982 | |
| JP | H0893891 A | * | 4/1996 | ......... F16H 57/0434 |
| JP | 2003306174 A | | 10/2003 | |
| JP | 2013141955 A | * | 7/2013 | ........... F16H 37/042 |
| JP | 2015054682 A | * | 3/2015 | |

OTHER PUBLICATIONS

JP-2015054682-A Machine English translation (Year: 2015).*
JP-2013141955-A Machine English translation (Year: 2013).*
JP-H0893891-A Machine English translation (Year: 1996).*
International Search Report in PCT/JP2023/031281, mailed Nov. 7, 2023, 2 pages.

* cited by examiner

*Primary Examiner* — Jason D Shanske
*Assistant Examiner* — Matthew James O'Neill
(74) *Attorney, Agent, or Firm* — Keating & Bennett, LLP

(57) ABSTRACT

A work vehicle includes a gear case in which lubricating oil is stored, and a transmission case positioned rearward of the gear case and in which lubricating oil is stored. The work vehicle also includes a communication passage to allow lubricating oil to flow back and forth between the gear case and the transmission case. A rear port, which is in communication with an interior of the transmission case and is for connection to a communication passage, is lower than a front port that is in communication with the interior of the gear case and is for connection to the communication passage.

6 Claims, 10 Drawing Sheets

WORK VEHICLE

CROSS REFERENCE TO RELATED APPLICATIONS

This application claims the benefit of priority to Japanese Patent Application No. 2022-210897 filed on Dec. 27, 2022 and is a Continuation Application of PCT Application No. PCT/JP2023/031281 filed on Aug. 29, 2023. The entire contents of each application are hereby incorporated herein by reference.

BACKGROUND OF THE INVENTION

1. Field of the Invention

The present invention relates to work vehicles.

2. Description of the Related Art

As disclosed in JP 2013-141955A, an electric work vehicle, which is one example of a work vehicle, includes a motor (corresponding to a motor section) and a gear case, and further includes a transmission case provided rearward of the gear case.

In JP 2013-141955A, motive power output from the motor is transmitted to a PTO transmission (corresponding to a power receiver) via a gear transmission housed in the gear case, and then transmitted from the PTO transmission to a PTO shaft. The motive power output from the motor is transmitted to a transmission housed in the transmission case, and then transmitted from the transmission to front wheels and rear wheels (corresponding to travel devices).

SUMMARY OF THE INVENTION

In JP 2013-141955A, lubricating oil is stored inside the gear case, lubricating oil is also stored inside the transmission case, and the gear case and the transmission case serve as oil baths.

In this case, the gear case and the transmission case may be connected via a communication passage, and lubricating oil may travel back and forth between the gear case and the transmission case via the communication passage. This promotes the dissipation of heat from the lubricating oil.

Example embodiments of the present invention lower the overall center of gravity of work vehicles including communication passages that allow lubricating oil to flow back and forth between gear cases and transmission cases.

A work vehicle according to an example embodiment of the present invention includes a motor, a travel device, a gear case that houses a gear transmission configured to receive motive power from the motor and is configured to store lubricating oil, a power receiver configured to receive motive power from the gear transmission, a transmission case positioned rearward of the gear case to house a transmission to transmit motive power from the motor to the travel device and is configured to store lubricating oil, a communication passage configured to allow lubricating oil to flow back and forth between the gear case and the transmission case, a rear port in communication with an interior of the transmission case and connected to the communication passage, and a front port in communication with an interior of the gear case and connected to the communication passage, the rear port being lower than the front port.

According to this example embodiment of the present invention, the work vehicle includes the gear case, the transmission case positioned rearward of the gear case, the communication passage connecting the gear case to the transmission case, the rear port that is in communication with the interior of the transmission case and is for connection to the communication passage, and the front port that is in communication with the interior of the gear case and is for connection to the communication passage, and in this example embodiment, the rear port is lower than the front port, and therefore the transmission case is able to be located at a lower position in the work vehicle.

By making it easier for the transmission case to be at a lower position in the work vehicle, the lower position of the transmission case in the work vehicle can lower the overall center of gravity of the work vehicle, thus making it possible to improve the stability of the work vehicle during traveling.

In an example embodiment of the present invention, it is preferable that the work vehicle further includes a battery to supply electric power to the motor, and the gear case is positioned rearward of the motor.

According to this example embodiment of the present invention, the gear case is positioned rearward of the motor, and therefore when the communication passage is connected to the front port and the rear port, the motor has less influence on the arrangement of the communication passage.

This allows the communication passage to be connected to the front port and the rear port with less influence from the motor, thus making it possible to improve the ease of attachment of the communication passage and improve productivity.

In an example embodiment of the present invention, it is preferable that the power receiver includes a hydraulic pump, and the work vehicle further includes a supply passage configured to supply lubricating oil from the gear case and the transmission case to the hydraulic pump as hydraulic oil.

According to this example embodiment of the present invention, in the case where the power receiver includes a hydraulic pump, the lubricating oil in the gear case and the transmission case is supplied to the hydraulic pump as hydraulic oil via the oil supply passage.

In this case, the gear case and the transmission case serve as a hydraulic oil tank with a large volume that is a combination of the volumes of the gear case and the transmission case, thus making it unlikely to have a shortage of hydraulic oil in a configuration in which hydraulic oil is supplied from the hydraulic pump to a hydraulic device or the like.

In an example embodiment of the present invention, it is preferable that the work vehicle further includes a continuously variable transmission in a front portion of the transmission case to change a speed of motive power received from the motor and transmit the motive power to the transmission, and a continuously variable transmission case which is in a front portion of the transmission case to house the continuously variable transmission, the rear port is provided in the continuously variable transmission case, and the work vehicle further includes an internal passage provided in the continuously variable transmission case and connecting the rear port to the interior of the transmission case.

According to this example embodiment of the present invention, the continuously variable transmission case is provided in a front portion of the transmission case, and the continuously variable transmission is housed in the continuously variable transmission case. Motive power output from the motor section is transmitted to the continuously variable transmission, the speed of the motive power is changed, and the resulting motive power is then transmitted to the transmission case and then transmitted from the transmission to a travel device.

Belt-type continuously variable transmissions are not oil-bathed, and hydrostatic continuously variable transmissions need to be configured such that the lubricating oil in the continuously variable transmission and the lubricating oil in the transmission case do not mix. Thus, the continuously variable transmission case and the transmission case are separated by a partition wall or the like.

According to the above example embodiment of the present invention, the rear port, to which the communication passage is connected, is provided in the continuously variable transmission case, and the internal passage that connects the rear port to the interior of the transmission case is provided in the continuously variable transmission case. As a result, lubricating oil flows back and forth between the gear case and the transmission case via the communication passage and the internal passage, and lubricating oil in the gear case and the transmission case does not enter the continuously variable transmission case.

According to the above example embodiment of the present invention, by providing the internal passage in the continuously variable transmission case, it is not necessary to adopt a configuration in which the communication passage is arranged so as to bypass the continuously variable transmission case and is connected to the rear port of the transmission case, which is advantageous in terms of simplifying the structure.

In an example embodiment of the present invention, it is preferable that the communication passage includes a bent metal tube.

According to this example embodiment of the present invention, the communication passage includes a bent metal tube, and therefore the communication passage can be easily connected to the front port and the rear port even in a configuration in which the rear port is at a lower position than the front port, and the transmission case is at a lower position in the body.

In an example embodiment of the present invention, it is preferable that the work vehicle further includes a posture maintaining portion configured to maintain the communication passage in a posture in which a front portion of the communication passage is higher than a rear portion of the communication passage, and the posture maintaining portion is located at a connection between the communication passage and the rear port.

When the communication passage is connected to the rear port and the positional relationship between the gear case and the transmission case is fixed while the front portion of the communication passage is connected to the front port, the communication passage is in a posture in which the front portion is higher than the rear portion, and therefore, due to the weight of the communication passage, the communication passage may rotate relative to the rear port around an axis extending in the longitudinal direction of the communication passage, such that the front portion of the communication passage becomes lower than the rear portion.

In such a case, it is necessary to interrupt the process of fixing the positional relationship between the gear case and the transmission case and return the communication passage to a posture in which the front portion is higher than the rear portion.

According to the above example embodiment of the present invention, the posture maintaining portion, which is provided to maintain the communication passage in a posture in which the front portion is higher than the rear portion, is provided at the connection between the communication passage and the rear port.

As a result, when the communication passage is connected to the rear port and the positional relationship between the gear case and the transmission case is fixed while the front portion of the communication passage is connected to the front port, the communication passage is prevented from assuming a posture in which the front portion is lower than the rear portion, and therefore the process of fixing the positional relationship between the gear case and the transmission case can be performed with fewer interruptions, thus improving productivity.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

FIGS. 1 to 11 show a tractor, which is an example of an electric work vehicle, and in FIGS. 1 to 11, F indicates the forward direction, B indicates the rearward direction, U indicates the upward direction, D indicates the downward direction, R indicates the rightward direction, and L indicates the leftward direction.

Figure 1:
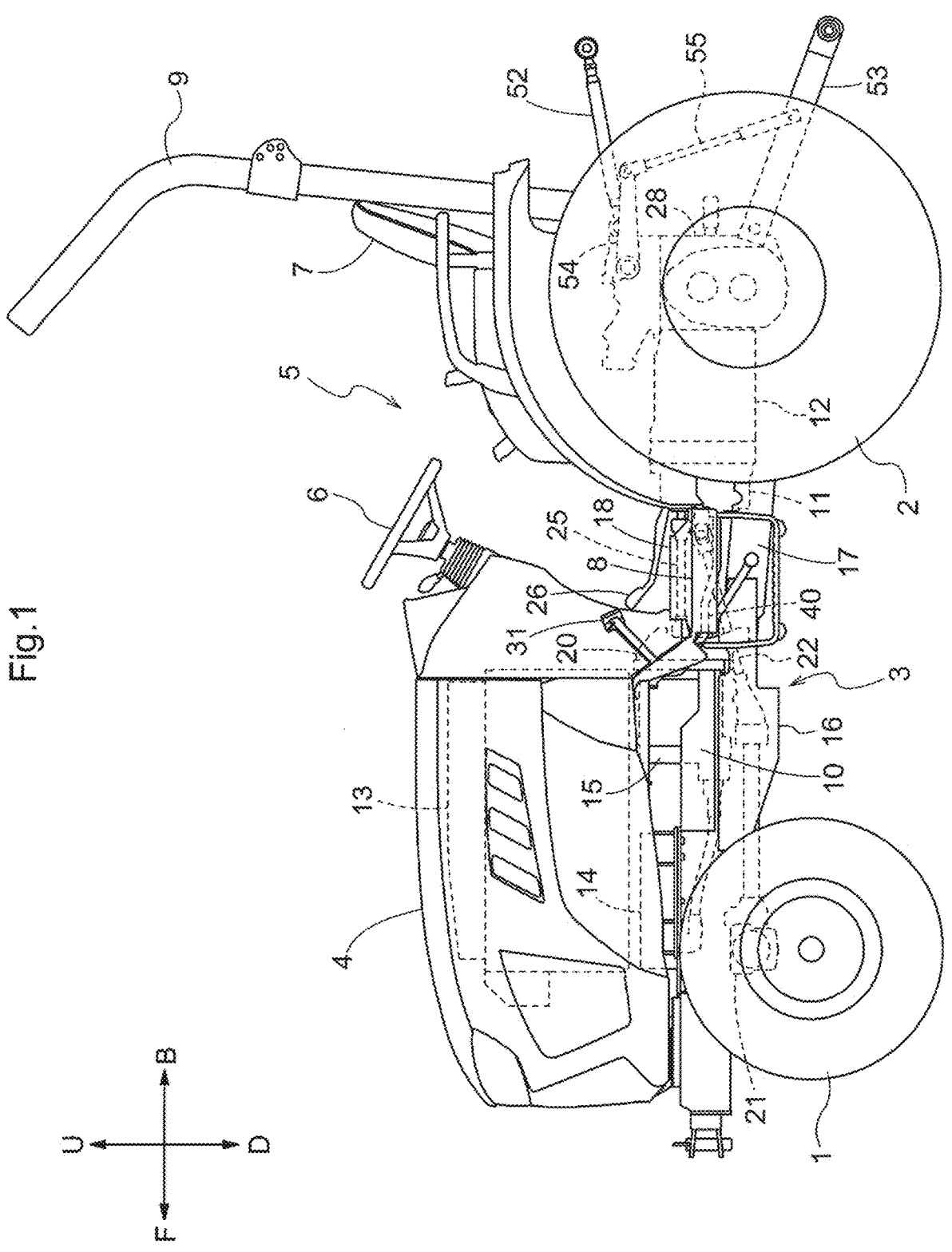
FIG. 1 is a left side view of a tractor.
Figure 2:
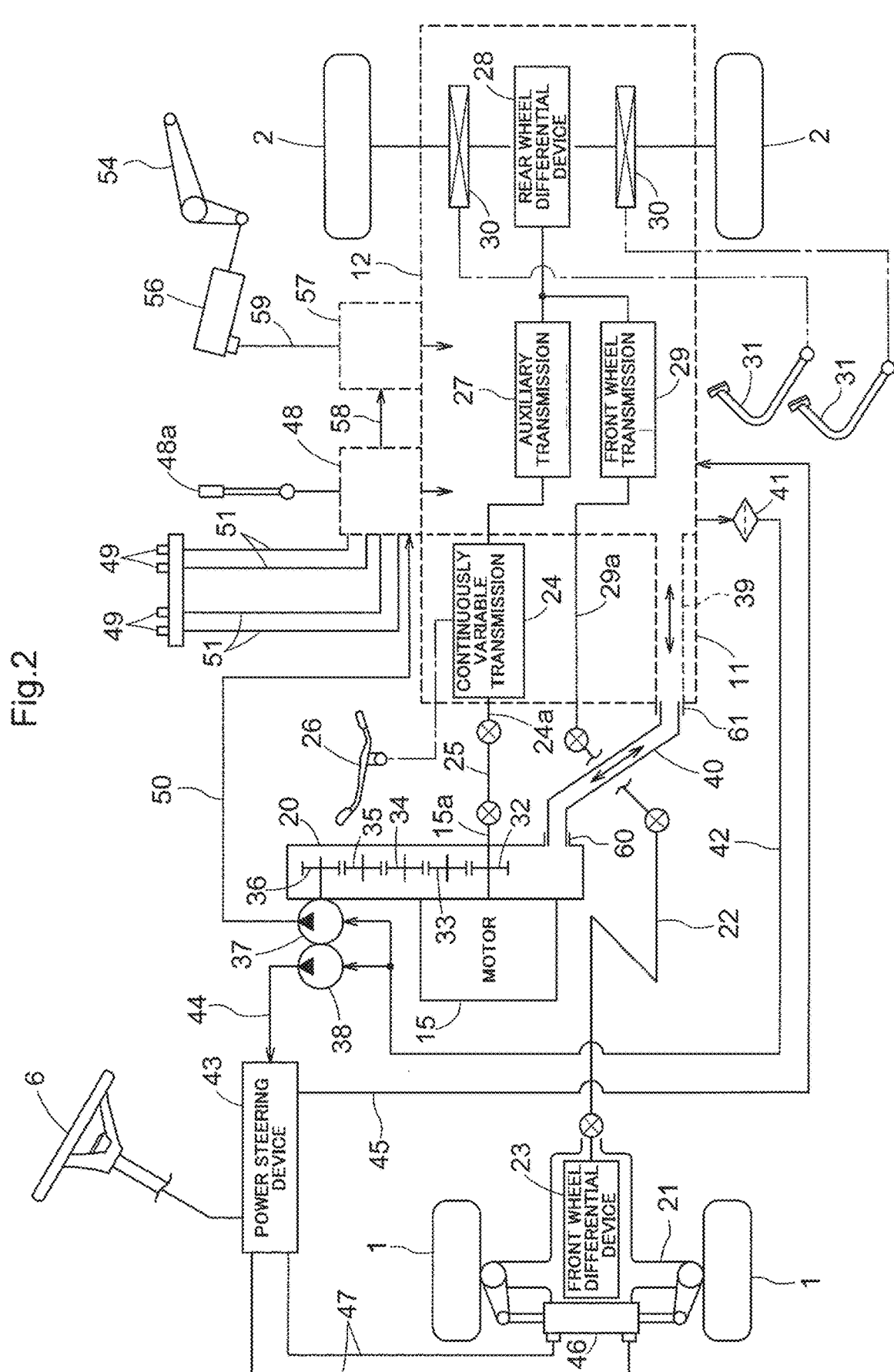
FIG. 2 is a schematic diagram illustrating a transmission system for transmission from a motor to front wheels and rear wheels, and a hydraulic system realized by a hydraulic pump.

As shown in FIGS. 1 and 2, a body 3 is supported by right and left front wheels 1 (corresponding to travel devices) and right and left rear wheels 2 (corresponding to travel devices). A bonnet 4 is provided in a front portion of the body 3, and a driver section 5 is provided in a rear portion of the body 3. The driver section 5 includes a steering wheel 6 for steering the front wheels 1, a driver seat 7, a floor section 8, and a ROPS frame 9.

A battery 13, an inverter 14, and a motor 15 are provided in a front portion of the body 3. Power stored in the battery 13 is supplied to the inverter 14, and the DC power from the battery 13 is converted to AC power in the inverter 14 and supplied to the motor 15 to drive the motor 15.

Figure 3:
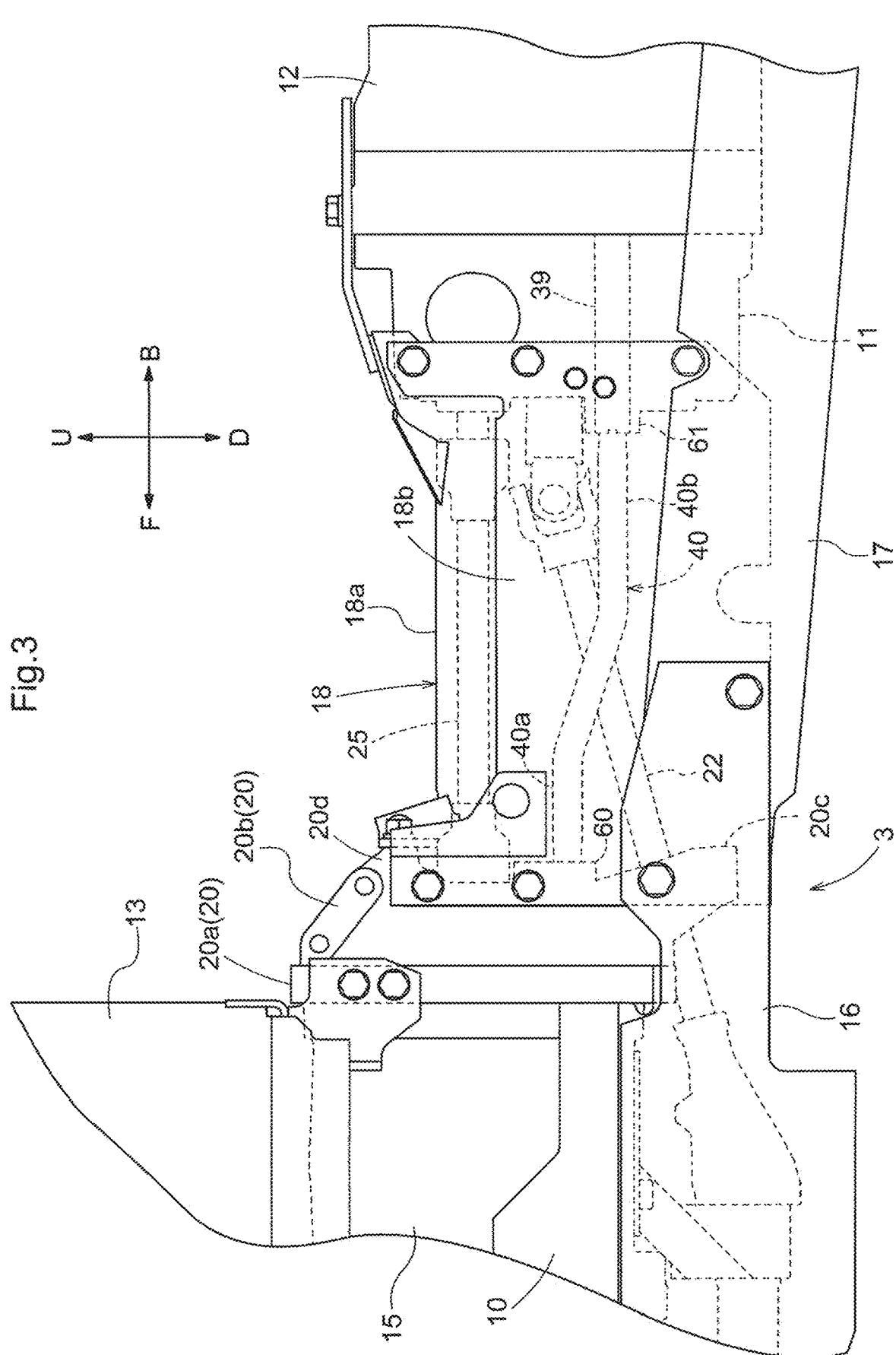
FIG. 3 is a left side view of a region including the motor, a gear case, main frames, coupling frames, and a continuously variable transmission case.
Figure 4:
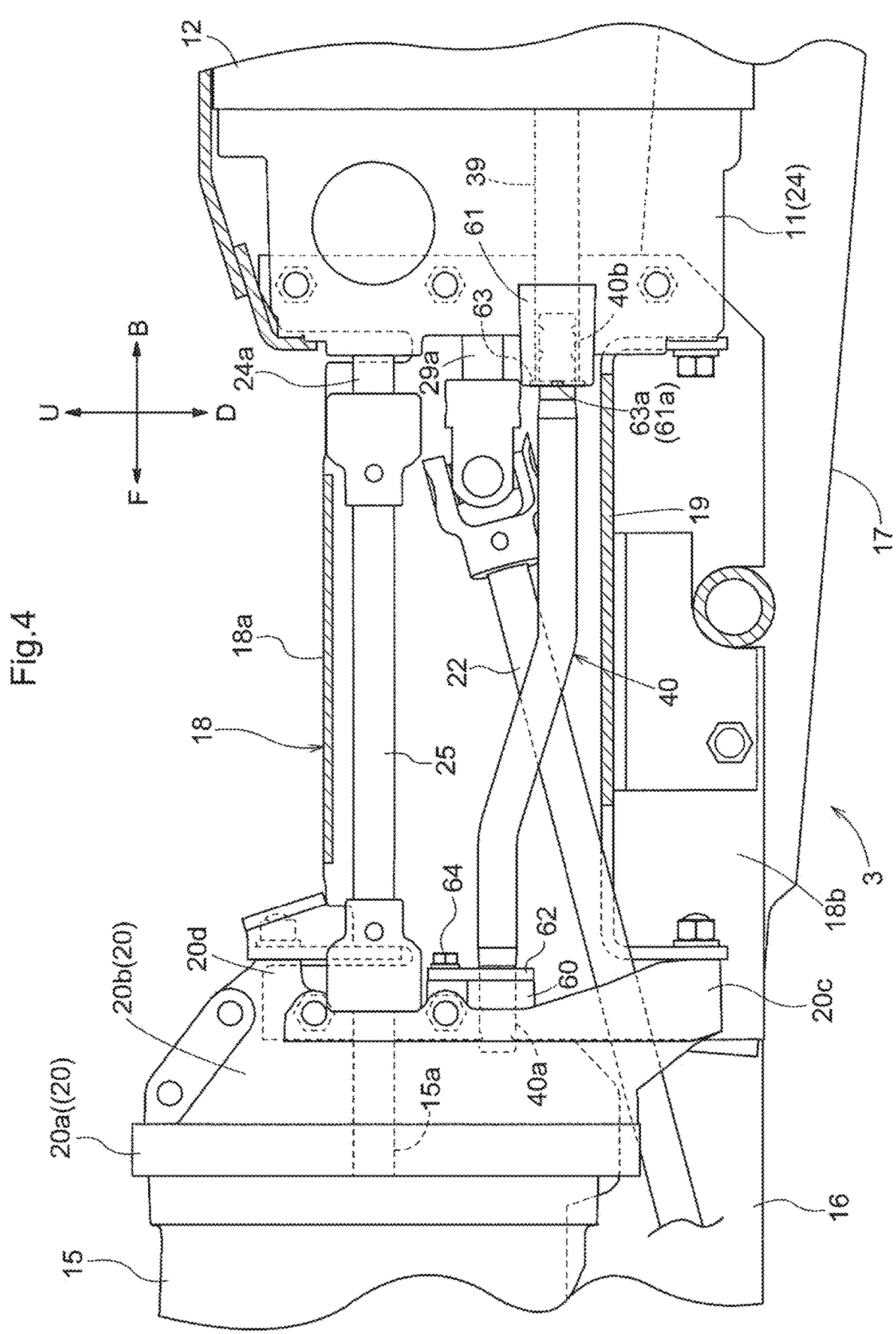
FIG. 4 is a vertical sectional left side view of a region including the motor, the gear case, the main frames, the coupling frames, and the continuously variable transmission case.

As shown in FIGS. 1, 3 and 4, the body 3 includes, for example, right main frames 10, 16, and 17, left main frames 10, 16, and 17, coupling frames 18 and 19, a gear case 20, a continuously variable transmission case 11, and a transmission case 12. A front axle case 21 is supported by front portions of the main frames 10, and the front wheels 1 are held by the front axle case 21. The rear wheels 2 are held by the transmission case 12.

The right main frame 16 is coupled to a rear portion of the right main frame 10. Furthermore, the left main frame 16 is coupled to a rear portion of the left main frame 10. The right main frame 17 is coupled to a rear portion of the right main frame 16. The left main frame 17 is coupled to a rear portion of the left main frame 16. The continuously variable transmission case 11 is coupled to a front portion of the transmission case 12, and the right and left main frames 17 are coupled to the continuously variable transmission case 11 and the transmission case 12.

The gear case 20 couples the right main frames 10, 16, and 17 to the left main frames 10, 16, and 17 in the left-right direction, and the motor 15 is coupled to the gear case 20. The battery 13 and the inverter 14 are supported by the main frame 10, and the battery 13 is covered by the bonnet 4.

Figure 5:
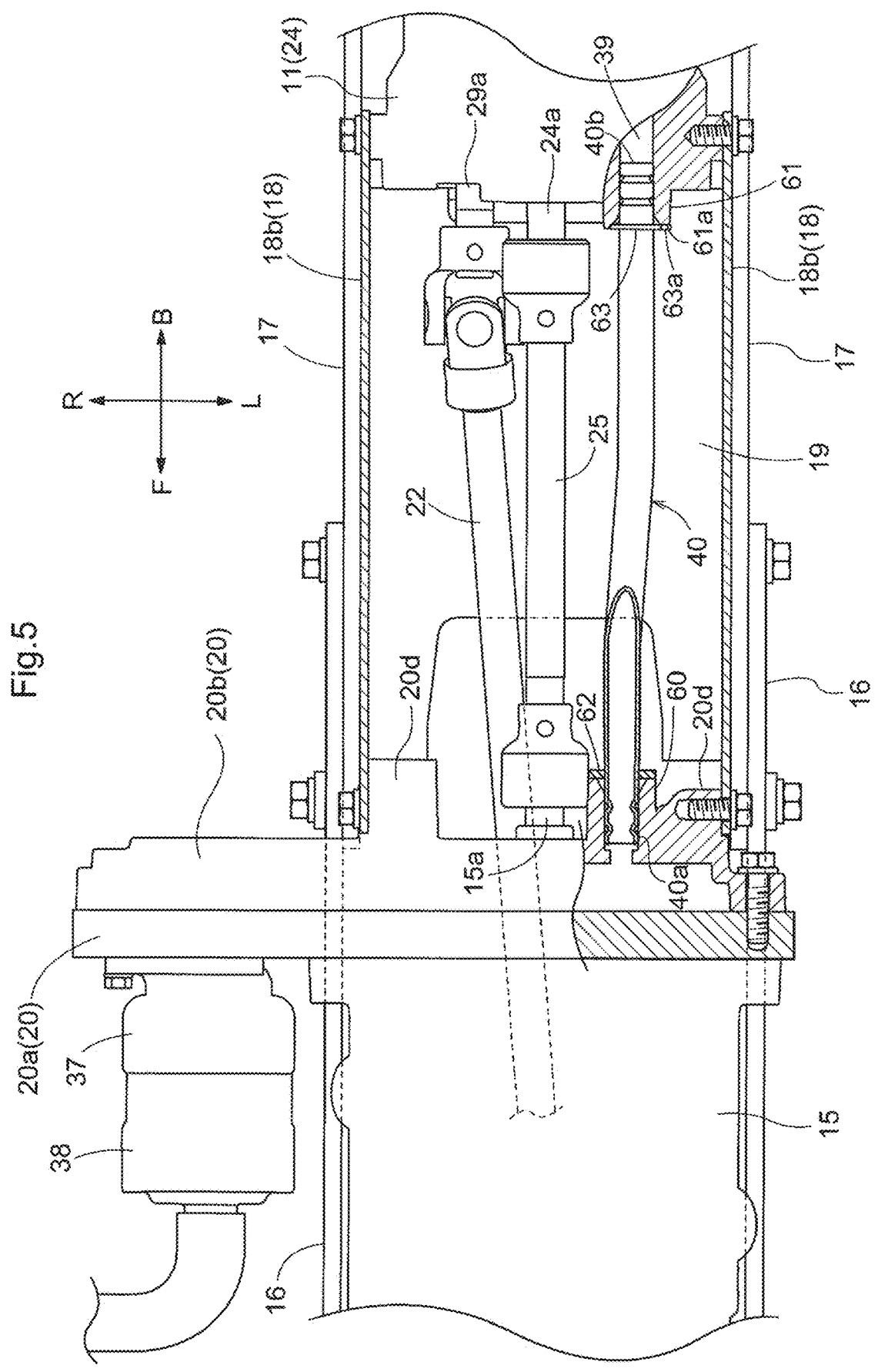
FIG. 5 is a transverse sectional plan view of a region including the motor, the gear case, the main frames, the coupling frames, and the continuously variable transmission case.
Figure 6:
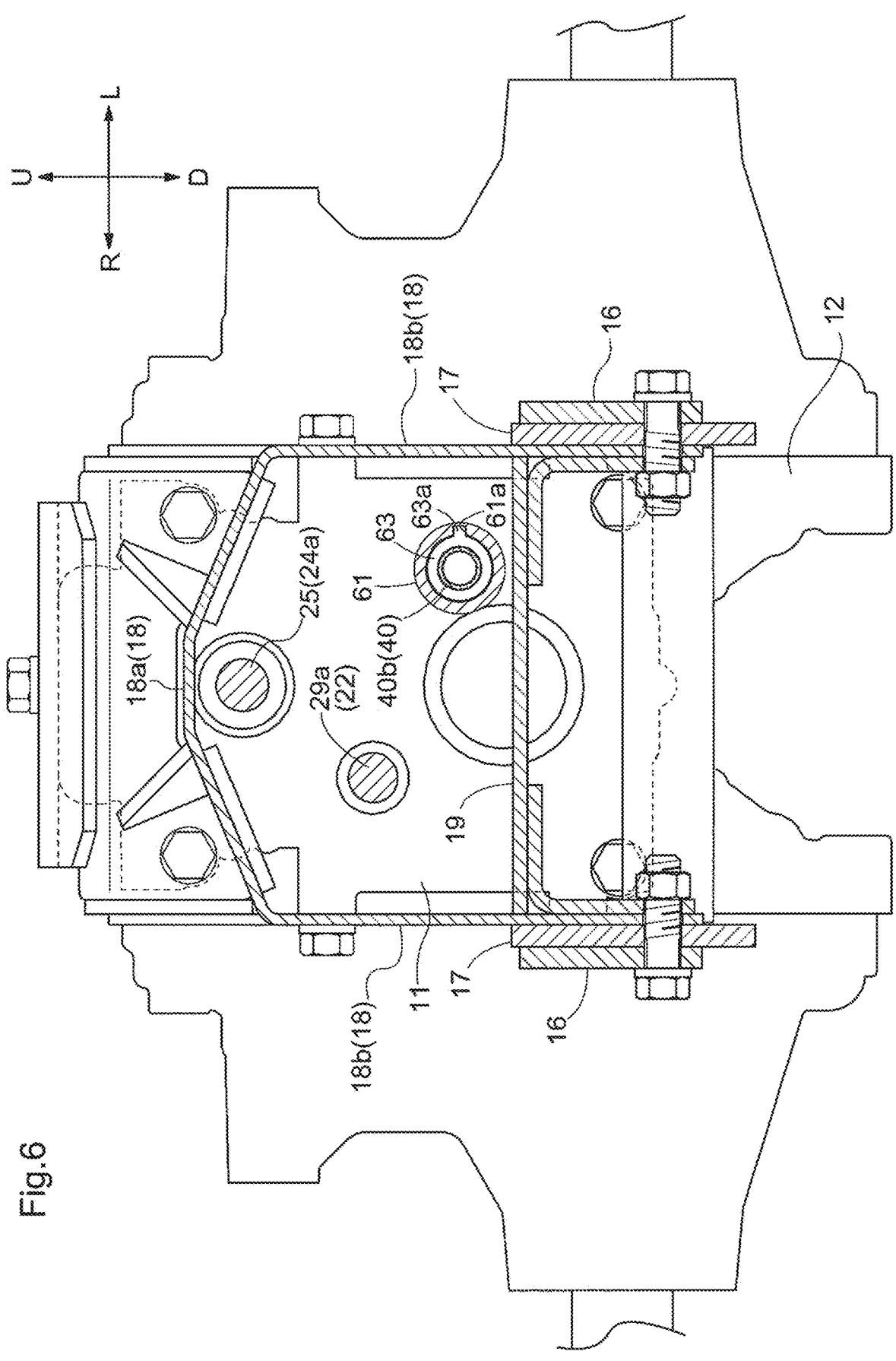
FIG. 6 is a vertical sectional front view of a region including the main frames, the coupling frames, and the continuously variable transmission case.
Figure 7:
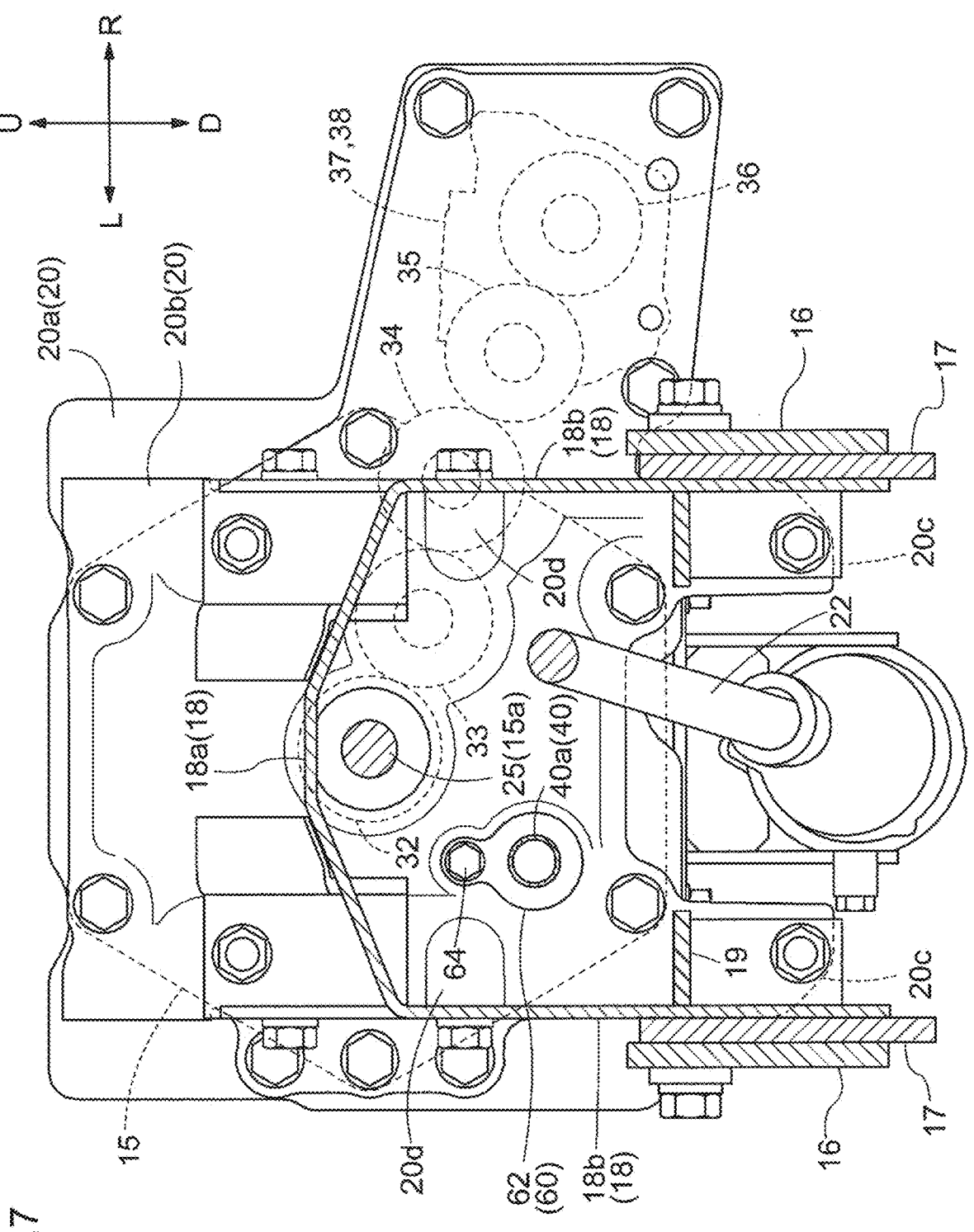
FIG. 7 is a vertical sectional rear view of a region including the gear case, the main frames, and the coupling frames.

As shown in FIGS. 5, 6 and 7, the coupling frame 18 has an upper surface portion 18a, a right side surface portion 18b, and a left side surface portion 18b, and is channel-shaped (tunnel-shaped). Front portions of the right side surface portion 18b and the left side surface portion 18b of the coupling frame 18 are coupled to the gear case 20, and rear portions of the right side surface portion 18b and the left side surface portion 18b of the coupling frame 18 are coupled to the continuously variable transmission case 11.

The coupling frame 19 is shaped as a flat plate, and is below the coupling frame 18. A front portion of the coupling frame 19 is coupled to the gear case 20, and a rear portion of the coupling frame 19 is coupled to the continuously variable transmission case 11. A right portion of the coupling frame 19 is fastened to the right main frames 16 and 17 and the right side surface portion 18b of the coupling frame 18. Also, a left portion of the coupling frame 19 is fastened to the left main frames 16 and 17 and the left side surface portion 18b of the coupling frame 18.

Figures 8, 9:
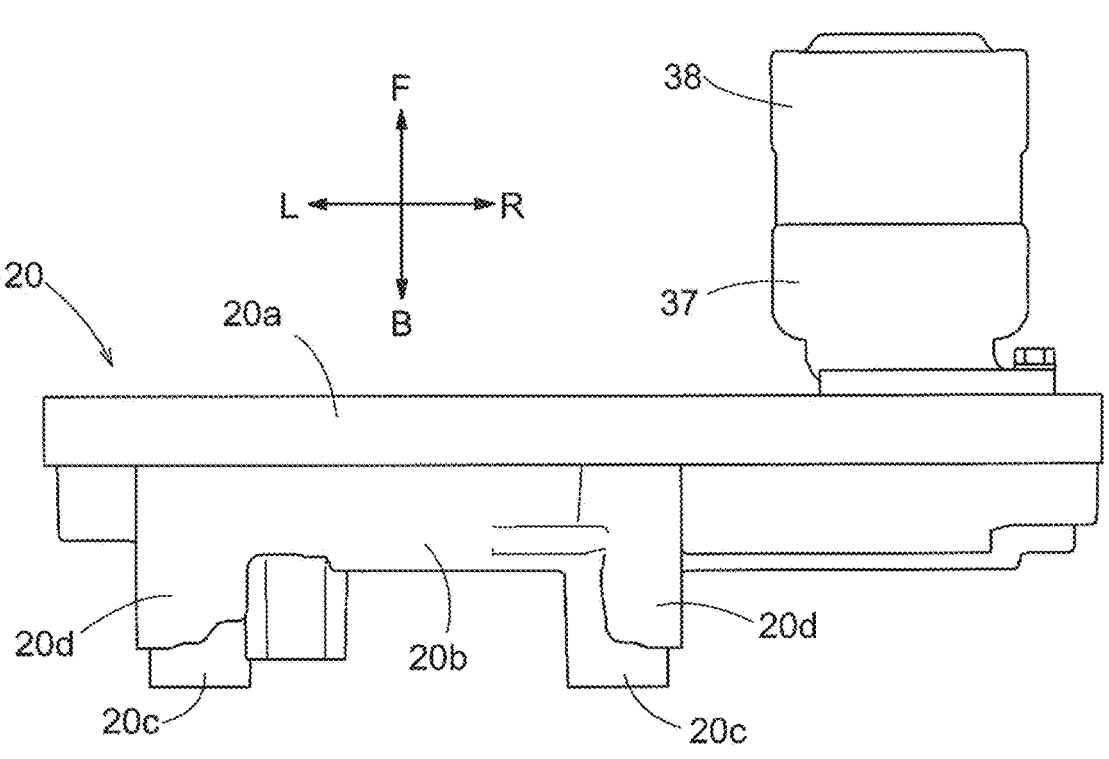
FIG. 8 is a plan view of the gear case and the hydraulic pump.
FIG. 9 is a rear view of the gear case.

As shown in FIGS. 7, 8, and 9, the gear case 20 includes a first portion 20a and a second portion 20b, the first portion 20a and the second portion 20b are coupled to each other, and right and left coupling portions 20c and 20d are included in the second portion 20b.

As shown in FIGS. 4 to 7, a front portion of the coupling frame 19 is coupled to the coupling portion 20c of the gear case 20. An upper portion of the right side surface portion 18b of the coupling frame 18 is coupled to an upper portion of the right coupling portion 20d of the gear case 20. Also, an upper portion of the left side surface portion 18b of the coupling frame 18 is coupled to an upper portion of the left coupling portion 20d of the gear case 20. A lower portion of the right side surface portion 18b of the coupling frame 18, a lower portion of the right coupling portion 20d of the gear case 20, and the right main frames 16 and 17 are fastened together. Also, a lower portion of the left side surface portion 18b of the coupling frame 18, a lower portion of the left coupling portion 20d of the gear case 20, and the left main frames 16 and 17 are fastened together.

As a result, the gear case 20 is arranged extending in the left-right direction and is coupled to the right main frames 10, 16, and 17 and the left main frames 10, 16, and 17 in such a manner that the first portion 20a of the gear case 20 is located on the front side and the second portion 20b of the gear case 20 is located on the rear side.

Figure 10:
FIG. 10 is a transverse sectional plan view of the gear case.

As shown in FIGS. 4, 5, and 7, the motor 15 is coupled to the first portion 20a of the gear case 20. As shown in FIGS. 7 and 10, an output shaft 15a of the motor 15 is inserted into the gear case 20, and inside the gear case 20, a transmission gear 32 (corresponding to a gear transmission) is coupled to the output shaft 15a of the motor 15. Transmission gears 33, 34, 35, and 36 (corresponding to gear transmissions) are provided inside the gear case 20, and adjacent gears among the transmission gears 32 to 36 are meshed with each other.

As shown in FIGS. 8 and 10, hydraulic pumps 37 and 38 (corresponding to power receivers) are coupled to the first portion 20a of the gear case 20, and input shafts of the hydraulic pumps 37 and 38 are connected to the transmission gear 36. Lubricating oil is stored inside the gear case 20, and the interior of the gear case 20 serves as an oil bath.

As shown in FIG. 2, a hydrostatic continuously variable transmission 24 is housed inside the continuously variable transmission case 11, and a transmission shaft 25 extends between the output shaft 15a of the motor 15 and the input shaft 24a of the continuously variable transmission 24.

Motive power output from the motor 15 is transmitted from the output shaft 15a of the motor 15 to the transmission gears 32 to 36, and the motive power output from the motor 15 is transmitted from the transmission gears 32 to 36 to the hydraulic pumps 37 and 38 to drive the hydraulic pumps 37 and 38.

Motive power output from the motor 15 is also transmitted from the output shaft 15a of the motor 15 to the continuously variable transmission 24 via the transmission shaft 25. The continuously variable transmission 24 is capable of continuously changing the speed to both faster and slower speeds, and is operated by a speed change pedal 26 (see FIG. 1) provided on the floor section 8.

An auxiliary transmission 27 (corresponding to a transmission), a rear wheel differential device 28 (corresponding to a transmission), a front wheel transmission 29 (corresponding to a transmission), and right and left brakes 30 are housed inside the transmission case 12. Motive power is transmitted from the continuously variable transmission 24 to the auxiliary transmission 27, and then transmitted from the auxiliary transmission 27 to the rear wheels 2 via the rear wheel differential device 28. Lubricating oil is stored inside the transmission case 12, and the interior of the transmission case 12 serves as an oil bath.

According to the above-described configuration, the tractor includes the gear case 20 that houses the transmission gears 32 to 36 (gear transmissions), which receive motive power from the motor 15 (motor section), and that stores lubricating oil. The tractor further includes the hydraulic pumps 37 and 38 (driven sections) that receive motive power from the transmission gears 32 to 36 (gear transmissions).

The motor 15 and the hydraulic pumps 37 and 38 are provided in front of the gear case 20, and the gear case 20 is provided behind the motor 15.

The continuously variable transmission case 11 is provided in a front portion of the transmission case 12 and houses the continuously variable transmission 24 that receives motive power from the motor 15, changes the speed of the motive power from the motor 15, and transmits the resulting motive power to the auxiliary transmission 27 (transmission), the rear wheel differential device 28 (transmission), and the front wheel transmission 29 (transmission).

In this case, the interior of the continuously variable transmission case 11 and the interior of the transmission case 12 are separated by a partition wall, and therefore the lubricating oil in the continuously variable transmission case 11 and the lubricating oil in the transmission case 12 do not mix with each other.

As shown in FIG. 2, motive power branched off from a point between the auxiliary transmission 27 and the rear wheel differential device 28 is transmitted to the front wheel transmission 29. The output shaft 29*a* of the front wheel transmission 29 passes through the continuously variable transmission case 11 and exits from the front portion of the continuously variable transmission case 11, and motive power from the front wheel transmission 29 is transmitted from the output shaft 29*a* of the front wheel transmission 29 via the transmission shaft 22 to the front wheel differential device 23 housed in the front axle case 21, and then from the front wheel differential device 23 to the front wheels 1.

As shown in FIGS. 4 to 7, the transmission shafts 22 and 25 are arranged extending in the front-rear direction in a tunnel-shaped space surrounded by the coupling frames 18 and 19. The transmission shaft 22 passes through a gap between the gear case 20 and the front portion of the coupling frame 19, extends obliquely downward and forward, and is connected to the front axle case 21 (front wheel differential device 23).

As shown in FIG. 2, when the front wheels 1 are turned from a straight ahead position to a position within a range of right and left set angles, the front wheel transmission 29 drives the front wheels 1 and the rear wheels 2 at the same speed. When the front wheels 1 are turned to the right or left beyond the right and left set angles, the front wheel transmission 29 drives the front wheels 1 at a higher speed than the rear wheels 2.

The right brake 30 is provided in the transmission system for transmission from the rear wheel differential device 28 to the right rear wheels 2, and the left brake 30 is provided in the transmission system for transmission from the rear wheel differential device 28 to the left rear wheels 2. A right brake pedal 31 capable of operating the right brake 30, and a left brake pedal 31 capable of operating the left brake 30 are provided on a left-front portion of the floor section 8 (see FIG. 1).

In order to turn right (turn left), the right (left) brake pedal 31, which is on the turning center side, is depressed to apply the right (left) brake 30, thereby enabling a tight turn.

According to the above configuration, the front wheels 1 and the rear wheels 2 are driven by the motor 15.

The tractor includes the transmission case 12 that is provided rearward of the gear case 20 and houses the auxiliary transmission 27 (transmission), the rear wheel differential device 28 (transmission), and the front wheel transmission 29 (transmission), and stores lubricating oil. The auxiliary transmission 27 transmits motive power output from the motor 15 to the front wheels 1 and the rear wheels 2.

As shown in FIG. 2, an internal passage 39 that extends in the front-rear direction is provided inside the continuously variable transmission case 11. The internal passage 39 is in communication with the interior of the transmission case 12.

A communication passage 40 connects the gear case 20 and the continuously variable transmission case 11, and the communication passage 40 is in communication with the internal passage 39. Furthermore, the communication passage 40 is in communication with the interior of the gear case 20.

Lubricating oil can flow back and forth between the interior of the gear case 20 and the interior of the transmission case 12 through the communication passage 40 and the internal passage 39, and the lubricating oil in the gear case 20 and the transmission case 12 does not mix with the lubricating oil in the continuously variable transmission case 11.

According to the above-described configuration, the tractor includes the communication passage 40 that allows lubricating oil to flow back and forth between the gear case 20 and the transmission case 12. Due to the communication passage 40 and the internal passage 39, the gear case 20 and the transmission case 12 define a single hydraulic oil tank.

A filter 41 is provided in the transmission case 12, and a supply passage 42 connects the filter 41 to the hydraulic pumps 37 and 38. Lubricating oil from the gear case 20 and the transmission case 12 passes through the filter 41 and the supply passage 42, and is supplied to the hydraulic pumps 37 and 38 as hydraulic oil.

According to the above-described configuration, the tractor includes the supply passage 42 that supplies lubricating oil from the gear case 20 and the transmission case 12 to the hydraulic pumps 37 and 38 as hydraulic oil.

As shown in FIG. 2, a power steering device 43 is provided below the steering wheel 6, and the power steering device 43 is operated by the steering wheel 6. The hydraulic pump 38 and the power steering device 43 are connected to each other by an oil passage 44, and the power steering device 43 and the transmission case 12 are connected to each other by an oil passage 45.

A double-action steering cylinder 46 to steer the front wheels 1 is provided in the front axle case 21, and the power steering device 43 and the steering cylinder 46 are connected by an oil passage 47.

Hydraulic oil from the hydraulic pump 38 is supplied to the power steering device 43 via the oil passage 44, and when the steering wheel 6 is operated, hydraulic oil is supplied from the power steering device 43 to the steering cylinder 46 via the oil passage 47, and the front wheels 1 are steered by the steering cylinder 46.

The hydraulic oil discharged from the steering cylinder 46 is returned to the transmission case 12 via the oil passage 47, the power steering device 43, and the oil passage 45. A fully-hydraulic power steering system includes the power steering device 43 and the steering cylinder 46.

As shown in FIG. 2, an external hydraulic unit 48 is attached to the outside of the transmission case 12, and two pairs of hydraulic ports 49 are attached to a lower portion of the floor section 8. The hydraulic pump 37 and the external hydraulic unit 48 are connected by an oil passage 50, and the external hydraulic unit 48 and the hydraulic ports 49 are connected by oil passages 51.

When a hydraulic device such as a front loader (not shown) is attached to the body 3, the hydraulic device (e.g., front loader) and the hydraulic ports 49 are connected by oil passages (not shown).

Hydraulic oil from the hydraulic pump 37 is supplied to the external hydraulic unit 48 via the oil passage 50, and is then supplied from the external hydraulic unit 48 to the hydraulic device via the oil passages 51 and the hydraulic ports 49 to drive the hydraulic device.

When an operating lever 48a of the external hydraulic unit 48 is operated, the hydraulic oil supplied from the external hydraulic unit 48 to the hydraulic device is operated to operate the hydraulic device. The hydraulic oil discharged from the hydraulic device returns to the external hydraulic unit 48 via the hydraulic ports 49 and the oil passages 51, and is returned from the external hydraulic unit 48 to the transmission case 12.

As shown in FIG. 1, a top link 52 and right and left lower links 53 are supported in a rear portion of the transmission case 12, and a work device (not shown) such as a rotary tiller can be connected to the top link and the lower links 53.

Right and left lift arms 54 are provided in a rear portion of the transmission case 12, and the lift arms 54 are connected to the lower links 53 by linking rods 55. When the lift arms 54 are swung up and down, the work device is raised and lowered via the top link 52 and the lower links 53.

As shown in FIG. 2, lift cylinders 56 provided to swing the lift arms 54, and a control valve 57, are provided in the transmission case 12. In the external hydraulic unit 48, the oil passage 50 branches into a system leading to the hydraulic ports 49 and a system leading to the control valve 57. The system leading to the control valve 57 is connected to the control valve 57 by an oil passage 58, and the control valve 57 is connected to the lift cylinders 56 by an oil passage 59.

Hydraulic oil from the hydraulic pump 37 is supplied to the control valve 57 via the oil passages 50 and 58, and is then supplied from the control valve 57 to the lift cylinders 56 via the oil passage 59, and thus the lift arms 54 are swung up and down by the lift cylinders 56. The hydraulic oil discharged from the lift cylinders 56 returns to the control valve 57 via the oil passage 59, and is then returned from the control valve 57 to the transmission case 12.

As shown in FIGS. 3, 4, 5, 7 and 9, a front port 60 is provided facing rearward in the second portion 20b of the gear case 20. The front port 60 is provided in the second portion 20b of the gear case 20 at a position lower than the output shaft 15a of the motor 15 and the transmission gear 32, on one side of the output shaft 15a of the motor 15 and the transmission gear 32, namely the side opposite to the transmission gears 33 to 36.

As shown in FIGS. 3 to 6, a rear port 61 is provided facing forward in a front portion of the continuously variable transmission case 11, and the rear port 61 is in communication with the internal passage 39 (see FIG. 2).

The rear port 61 is provided in the front portion of the continuously variable transmission case 11, at a position lower than the input shaft 24a of the continuously variable transmission 24 and the output shaft 29a of the front wheel transmission 29, on one side of the output shaft 29a of the front wheel transmission 29, namely the side opposite to the input shaft 24a of the continuously variable transmission 24.

As shown in FIGS. 3 to 6, the front port 60 and the rear port 61 are provided in a tunnel-shaped space surrounded by the coupling frames 18 and 19. When the gear case 20, the continuously variable transmission case 11, and the transmission case 12 are coupled to the main frames 10, 16, and 17, the rear port 61 is at a lower position than the front port 60.

Figure 11:
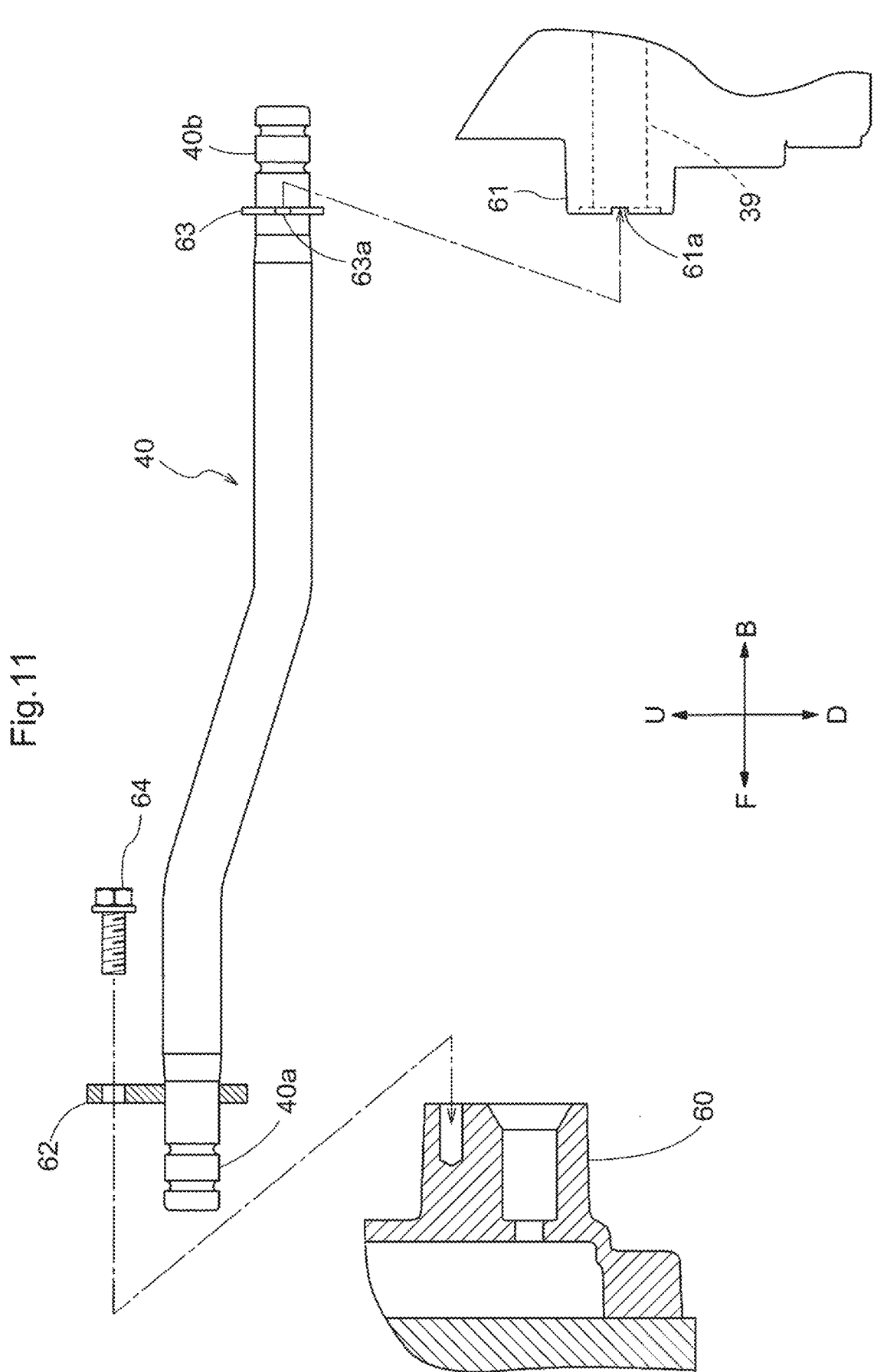
FIG. 11 is a left side view of a communication passage, a front port, and a rear port.

As shown in FIG. 11, the communication passage 40 includes a metal pipe bent into a crank shape. A flange portion 62 is coupled to the front portion 40a of the communication passage 40. A flange portion 63 (corresponding to a posture maintaining portion) is coupled to the rear portion 40b of the communication passage 40, and a protrusion 63a that protrudes radially outward from the flange portion 63 is provided at one location on the outer peripheral portion of the flange portion 63. A notched recess 61a (corresponding to a posture maintaining portion) is provided at one location on the outer peripheral portion of the front end portion of the rear port 61.

As shown in FIGS. 3 to 7, when the gear case 20, the continuously variable transmission case 11, and the transmission case 12 are coupled to the main frames 10, 16, and 17 and the coupling frames 18 and 19, the communication passage 40 is also connected to the front port 60 and the rear port 61.

In this case, before connecting the gear case 20, the continuously variable transmission case 11, and the transmission case 12 to the main frames 10, 16, and 17 and the coupling frames 18 and 19, the rear portion 40b of the communication passage 40 is inserted into the rear port 61, and the protrusion 63a of the flange portion 63 is inserted into the recess 61a of the rear port 61, as shown in FIGS. 5, 6, and 11. The communication passage 40 is held in the rear port 61 in a posture in which the front portion 40a of the communication passage 40 is higher than the rear portion 40b of the communication passage 40.

In the above-mentioned state, the gear case 20, the continuously variable transmission case 11, and the transmission case 12 are moved toward each other, and the front portion 40a of the communication passage 40 is inserted into the front port 60.

In this case, since the protrusion 63a of the flange portion 63 has been inserted into the recess 61a of the rear port 61, the communication passage 40 rotates around an axis passing through the rear port 61 in the front-rear direction due to the weight of the front portion 40a of the communication passage 40, and the communication passage 40 does not take a posture in which the front portion 40a is lower than the rear portion 40b of the communication passage 40.

After inserting the front portion 40a of the communication passage 40 into the front port 60 as described above, the gear case 20, the continuously variable transmission case 11 and the transmission case 12 need only be coupled to the main frames 10, 16, and 17 and the coupling frames 18 and 19. As shown in FIGS. 4, 7 and 11, the flange portion 62 is coupled to an upper portion of the front port 60 using a bolt 64, and thus, the communication passage 40 connects the front port 60 and the rear port 61 to each other.

According to the above-described configuration, the tractor includes the flange portion 63 and the recess 61a that maintain the communication passage 40 in a posture in which the front portion 40a is higher than the rear portion 40b. The flange portion 63 and the recess 61a are provided at the connection between the communication passage 40 and the rear port 61.

First Alternative Example Embodiment of Invention

The continuously variable transmission case 11 and the continuously variable transmission 24 may be omitted.

According to this configuration, the rear port 61 is provided in a front portion of the transmission case 12, and the internal passage 39 is not required.

Second Alternative Example Embodiment of Invention

The recess 61a of the rear port 61 may be omitted, the rear portion 40b of the communication passage 40 may be inserted into the rear port 61, and the flange portion 63 may be coupled to the rear port 61 by a bolt (not shown, but corresponding to a posture maintaining portion). According to this configuration, the bolt 64 to connect the flange portion 62 to the front port 60 is not necessary.

Third Alternative Example Embodiment of Invention

The communication passage 40 may include a flexible tube such as a rubber hose.

According to this configuration, after coupling the gear case 20, the continuously variable transmission case 11, and the transmission case 12 to the main frames 10, 16, and 17 and the coupling frames 18 and 19, the communication passage 40 can be connected to the front port 60 and the rear port 61, thus eliminating the need for posture maintaining portions such as the flange portion 63 and the recess 61*a* of the rear port 61.

Fourth Alternative Example Embodiment of Invention

Instead of the hydraulic pumps 37 and 38, a work device such as a grass cutting device (not shown) may be provided as the power receiver, and motive power output from the transmission gear 36 of the gear case 20 may be transmitted to the work device.

Fifth Alternative Example Embodiment of Invention

Instead of the rear wheels 2, a crawler travel device (not shown) may be provided as the travel device.

Instead of the front wheels 1 and the rear wheels 2, a crawler travel device (not shown) may be provided as the travel device.

Instead of the motor 15, an engine (not shown) may be provided as the motor section.

Example embodiments of the present invention are applicable not only to tractors, but also to other work vehicles such as electric carts and transport vehicles, and construction work vehicles such as wheel loaders.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a motor;
   front and rear travel devices;
   a gear case that houses a gear transmission configured to receive motive power from the motor, and is configured to store lubricating oil;
   a power receiver configured to receive motive power from the gear transmission;
   a transmission case positioned rearward of the gear case to house a transmission to transmit motive power from the motor to the front and rear travel devices, and is configured to store lubricating oil;
   a communication passage configured to allow lubricating oil to flow back and forth between the gear case and the transmission case;
   a rear port in communication with an interior of the transmission case and connected to the communication passage; and
   a front port in communication with an interior of the gear case and connected to the communication passage;
   the rear port being lower than the front port.

2. The work vehicle according to claim 1, further comprising:
   a battery to supply electric power to the motor; wherein
   the gear case is positioned rearward of the motor.

3. The work vehicle according to claim 1, wherein
   the power receiver includes a hydraulic pump; and
   the work vehicle further comprises a supply passage to supply lubricating oil from the gear case and the transmission case to the hydraulic pump as hydraulic oil.

4. The work vehicle according to claim 1, further comprising:
   a continuously variable transmission in a front portion of the transmission case to change a speed of motive power received from the motor and transmit the motive power to the transmission; and
   a continuously variable transmission case in a front portion of the transmission case to house the continuously variable transmission; wherein
   the rear port is provided in the continuously variable transmission case; and
   the work vehicle further comprises an internal passage provided in the continuously variable transmission case and connecting the rear port to the interior of the transmission case.

5. The work vehicle according to claim 1, wherein the communication passage includes a bent metal tube.

6. The work vehicle according to claim 1, further comprising:
   a posture maintaining portion configured to maintain the communication passage in a posture in which a front portion of the communication passage is higher than a rear portion of the communication passage; wherein
   the posture maintaining portion is located at a connection between the communication passage and the rear port.

* * * * *